United States Patent
Hartness et al.

(10) Patent No.: US 8,234,846 B2
(45) Date of Patent: Aug. 7, 2012

(54) SHRINK FILM APPLYING APPARATUS HAVING INDEPENDENTLY DRIVABLE FLIGHT BAR ASSEMBLIES

(75) Inventors: Thomas P. Hartness, Greenville, SC (US); Mark W. Davidson, Greer, SC (US)

(73) Assignee: Illinois Tool Works Inc., Glenview, IL (US)

( * ) Notice: Subject to any disclaimer, the term of this patent is extended or adjusted under 35 U.S.C. 154(b) by 404 days.

(21) Appl. No.: 12/558,495

(22) Filed: Sep. 12, 2009

(65) Prior Publication Data
US 2011/0061339 A1 Mar. 17, 2011

(51) Int. Cl.
B65B 9/02 (2006.01)
(52) U.S. Cl. .............. 53/553; 53/147; 53/398; 53/466; 53/586; 53/557
(58) Field of Classification Search ........... 53/397–399, 53/427, 441, 443, 461, 466, 509, 147, 545, 53/553, 556, 557
See application file for complete search history.

(56) References Cited

U.S. PATENT DOCUMENTS

| | | | |
|---|---|---|---|
| 3,295,290 A | 1/1967 | Billingsley et al. | |
| 3,357,151 A | 12/1967 | Monaghan | |
| 3,729,894 A | 5/1973 | Stohlquist | |
| 3,736,723 A | 6/1973 | Lattke | |
| 3,857,474 A | 12/1974 | Hutson | |
| 3,990,572 A | 11/1976 | Fishback | |
| 4,365,456 A | 12/1982 | Ullman | |
| 4,454,704 A | 6/1984 | Ullman | |
| 4,475,653 A | 10/1984 | Ullman | |
| 4,569,185 A * | 2/1986 | Feliks et al. ................. 53/580 |
| 4,609,101 A * | 9/1986 | Ullman ........................ 206/432 |
| 4,702,060 A | 10/1987 | Reid | |
| 5,069,016 A * | 12/1991 | Grossi ........................ 53/398 |
| 5,238,101 A | 8/1993 | Ota et al. | |
| 5,314,057 A | 5/1994 | Calvert et al. | |
| 5,328,021 A | 7/1994 | Calvert et al. | |
| 5,360,099 A | 11/1994 | Culpepper et al. | |
| 5,450,708 A * | 9/1995 | Lashyro ...................... 53/399 |
| 5,540,036 A | 7/1996 | Scroggin et al. | |
| 5,755,075 A | 5/1998 | Culpepper | |
| 5,875,880 A | 3/1999 | Johnson | |
| 5,934,049 A * | 8/1999 | Cerf ............................ 53/553 |
| 7,506,486 B2 | 3/2009 | Wegner et al. | |

OTHER PUBLICATIONS

U.S. Appl. No. 10/982,403, filed Nov. 5, 2004, Duterte et al., Modified Shrink Wrap Machine, Assembly and Related Method.
U.S. Appl. No. 10/982,404, filed Nov. 5, 2004, Duterte et al., Shrink Wrap Machine With Film Cutting Mechanism, Film Cutting Assembly and Related Methods.
U.S. Appl. No. 12/490,967, filed Jun. 24, 2009, Miller et al., Flight Bar Assembly, Apparatus and Methods for Nestable Collation of Objects.
"Wrapping Up Bottled Water", Packaging Digest, May 2005—5 pages.

* cited by examiner

Primary Examiner — Christopher Harmon
(74) Attorney, Agent, or Firm — Dority & Manning, P.A.

(57) ABSTRACT

A shrink film applying apparatus includes an article feed for feeding articles for shrink-wrapping at line pressure; a wrapping conveyor driven at a wrapping speed through a wrapping zone, the wrapping conveyor receiving articles from the article feed. First and second films are supplied to the wrapping zone. A plurality of flight bars are individually driven in a path at a variable speed. A sealing mechanism within the wrapping zone seals the first film to the second film at contact points to form a circumferential film unit substantially surrounding grouped articles within loops of second film and a corresponding portion of the first film, the film unit being shrinkable about the grouped articles to form a package. Related methods and subassemblies of the apparatus are disclosed.

14 Claims, 11 Drawing Sheets

SHRINK FILM APPLYING APPARATUS HAVING INDEPENDENTLY DRIVABLE FLIGHT BAR ASSEMBLIES

TECHNICAL FIELD

The present disclosure relates to shrink film applying apparatus having independently drivable flight bar assemblies. Related methods and sub-assemblies of the apparatus are also disclosed.

BACKGROUND

Various methods and devices have been proposed for grouping and holding objects such as containers for shipping. For example, paperboard or cardboard cartons, boxes and trays, stretch wrapping and shrink wrapping, as well as combinations of the above have been employed. Various types of machines have been developed to feed, group, and package such containers.

When shrink wrapping is employed, often objects are grouped on a cardboard tray having folded up edges before applications and shrinking of the shrink film. Such trays are employed to provide stability during loading, shrink wrapping and shipment. Trays are typically rectangular, with four folded-up sides to. The edges are typically glued and/or stapled to hold them in the desired form. The articles, if all of the same type, are typically arranged in a grid on the tray. Twenty-four bottles could be arranged in a 4×6 grid on a tray, for example. Alternatively, blanks in the form of rectangular sheets of cardboard (without the folded up edges) have also been used to provide similar benefits.

Also, grouped objects can also be surrounded by one or more sheets of shrink wrap material without such trays or blanks. Typically, such shrink-wrapping requires the articles to be surrounded about their circumference by one or more pieces of film, which are then shrunk around the objects to form the package. The film typically overlaps more than 360 degrees around the objects with some overlap.

Objects to be shrink-wrapped, whether with or without trays or blanks, are fed to a wrapping zone of an apparatus already grouped. That is, the group of articles to be wrapped is separated in some way from other articles in the feed. This can be done using pin conveyors, conveyors of differing speeds, etc., to create spaces between groupings in the direction of flow so that the groupings can be individually surrounded by the film or films. Use of such equipment upstream from and within a wrapping zone can be expensive, can consume a great amount of floor space, and/or can slow a production line.

Accordingly, there remains a need for improved shrink film applying apparatus, flight bar assemblies, and methods for packaging groups of articles overcoming any of the above drawbacks or others.

SUMMARY

In accordance with some aspects of the present subject matter, a shrink film applying apparatus includes an article feed for feeding articles for shrink-wrapping at line pressure; a wrapping conveyor driven at a wrapping speed through a wrapping zone, the wrapping conveyor receiving articles from the article feed; a first film supply supplying a first film to the wrapping zone, the first film being fed to a position above the wrapping conveyor and beneath the articles; a second film supply supplying a second film to the wrapping zone, the second film being fed to a position above the first film and the articles; a plurality of flight bars and a plurality of flight bar drives, each flight bar individually driven in a path at a variable speed by a respective one of the flight bar drives, the second film being sequentially pulled down between selected articles by the flight bars so as to form loops of the second film in the wrapping zone between adjacent flight bars, each loop of the second film having a contact point adjacent the respective flight bar contacting the first film; and a sealing mechanism within the wrapping zone for sealing the first film to the second film at the contact points to form a circumferential film unit substantially surrounding grouped articles within each loop of second film and a corresponding portion of the first film, the film unit being shrinkable about the grouped articles to form a package. Various options and modifications are possible.

For example, the wrapping conveyor may include a plurality of independent slats and a track, the slats being driven by a drive along the track in a path, each of the slats being movable relative to adjacent slats along the path. Also, the flight bars may each include alignment elements configured to fit between adjacent slats in the wrapping conveyor, the alignment elements self-adjustably moving certain of the slats relative to each other to an extent necessary for the alignment elements to fit between the slats as the flight bars approach the wrapping conveyor. The flight bars may include two plates mounted so as to be movable relative to each other in a direction of travel, the flight bars contacting a frame of the shrink film applying assembly in the wrapping zone to move apart the two plates, the alignment elements moving apart adjacent slats of the wrapping conveyor when the plates of the flight bars move apart.

The sealing mechanism may be disposed beneath the wrapping conveyor, the sealing mechanism proving heat to the wrapping zone to seal the first film to the second film, and it may provide heat at least when the two plates of the flight bars and the adjacent slats are moved apart.

A controller may be provided to control the flight bar drives, a wrapping conveyor drive, and a sealing mechanism drive so that the flight bars, the wrapping conveyor and the sealing mechanism operate in synchronicity. The controller may cause the wrapping conveyor to be driven at a constant speed and the flight bars and sealing mechanism to be driven at a constant speed within at least a portion of the wrapping zone, and/or may cause the flight bars and sealing mechanism to be driven at a variable speed along at least a portion of their respective travel.

The sealing mechanism and flight bars may cooperate to separate adjacent respective film units and grouped articles within the wrapping zone. The flight bars may include two plates mounted so as to be movable relative to each other in a direction of travel, the flight bars contacting a frame of the shrink film applying apparatus in the wrapping zone to move apart the two plates, thereby separating the adjacent film units and grouped articles.

The wrapping conveyor may include compression spring elements between adjacent slats. Each of the fight bar drives may includes a variable speed servo-motor for driving a chain, a respective one of the flight bars being attached to each chain. The apparatus may also include at least four of the flight bars and flight bar drives.

The disclosure also is directed to related methods and subassemblies of the apparatus.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to a shrink film applying apparatus. The apparatus is capable of surrounding grouped products for packaging with shrink film. If desired, the products may be fed at line pressure into the wrapping zone rather than being separated into groupings upstream of the film wrapping zone.

Figure 1:
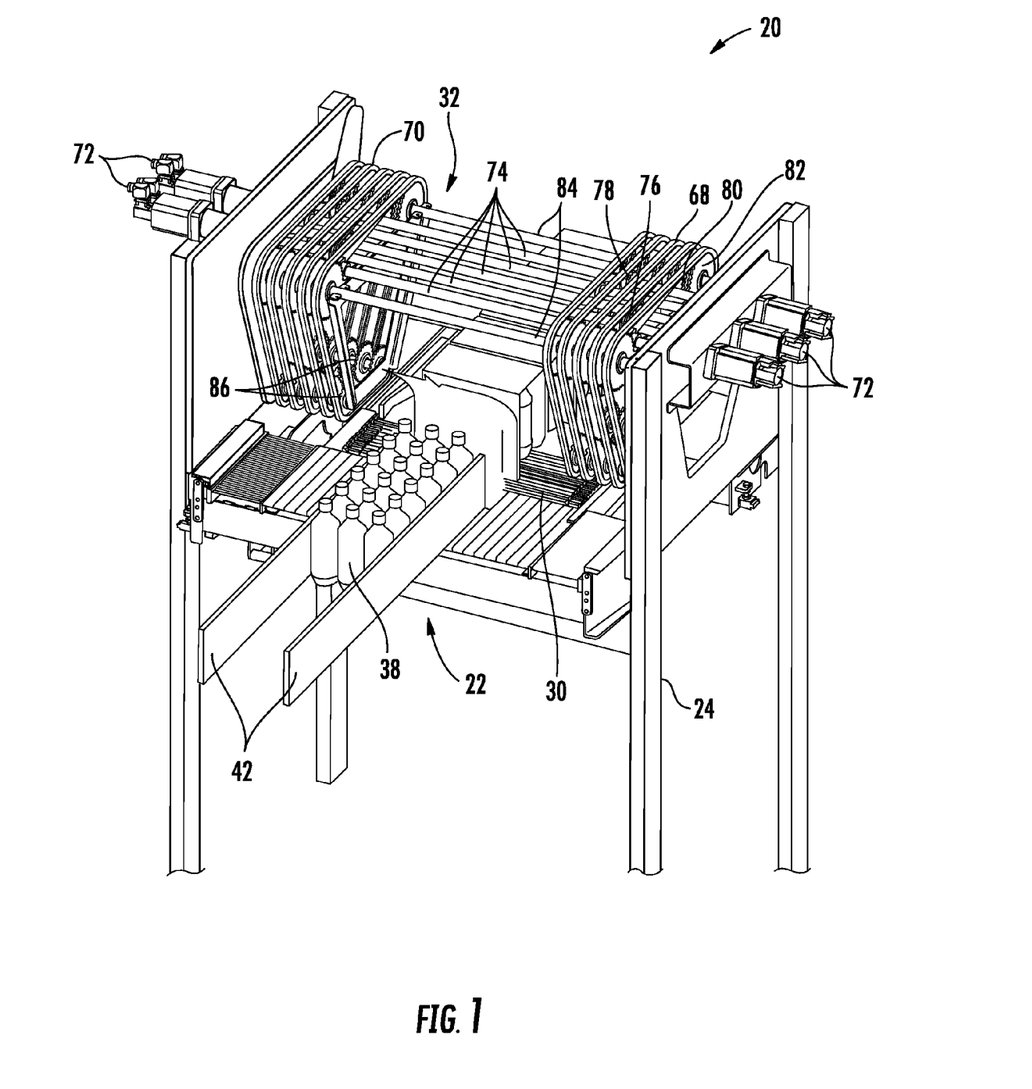
FIG. 1 is a perspective view of one shrink film applying apparatus according to certain aspects of the present disclosure.
Figure 2:
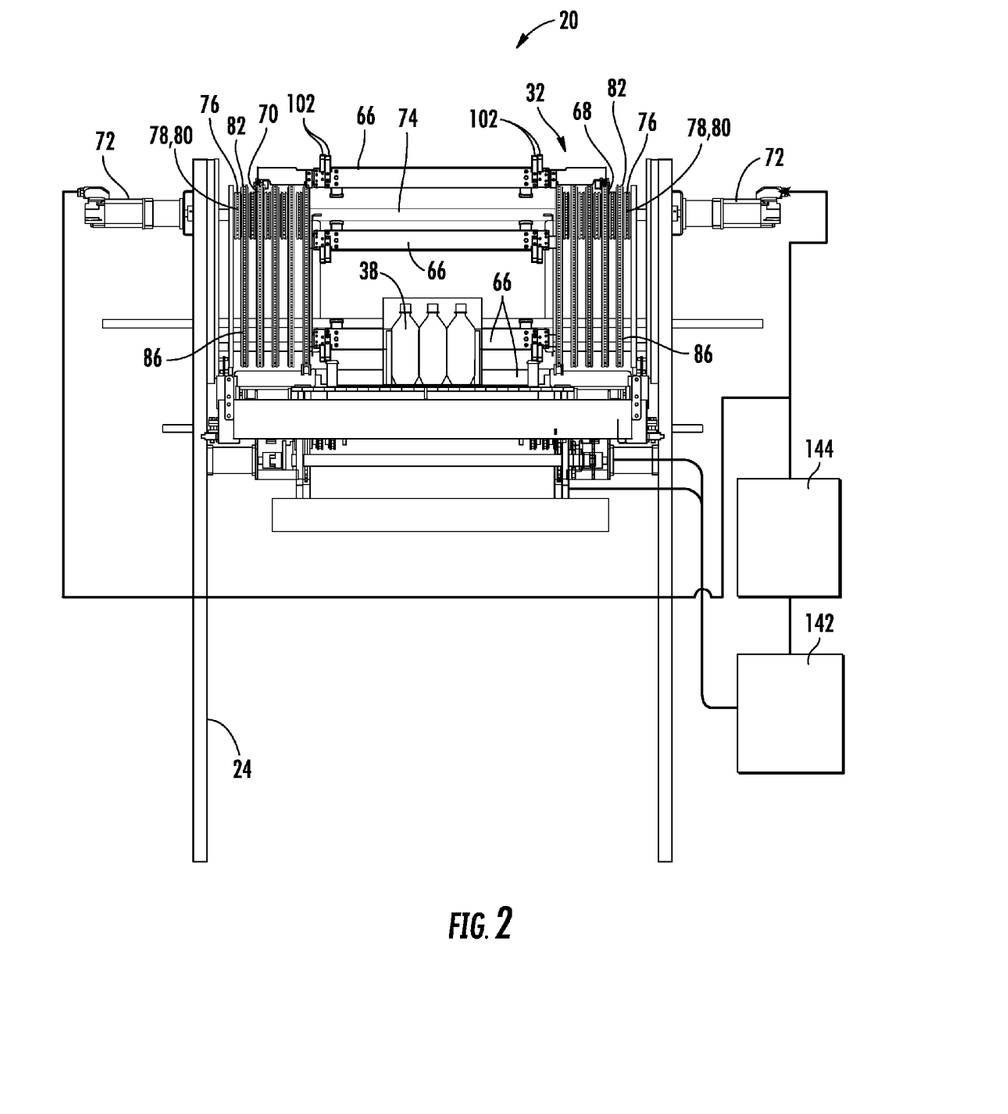
FIG. 2 is an end view of the apparatus of FIG. 1.
Figure 3:
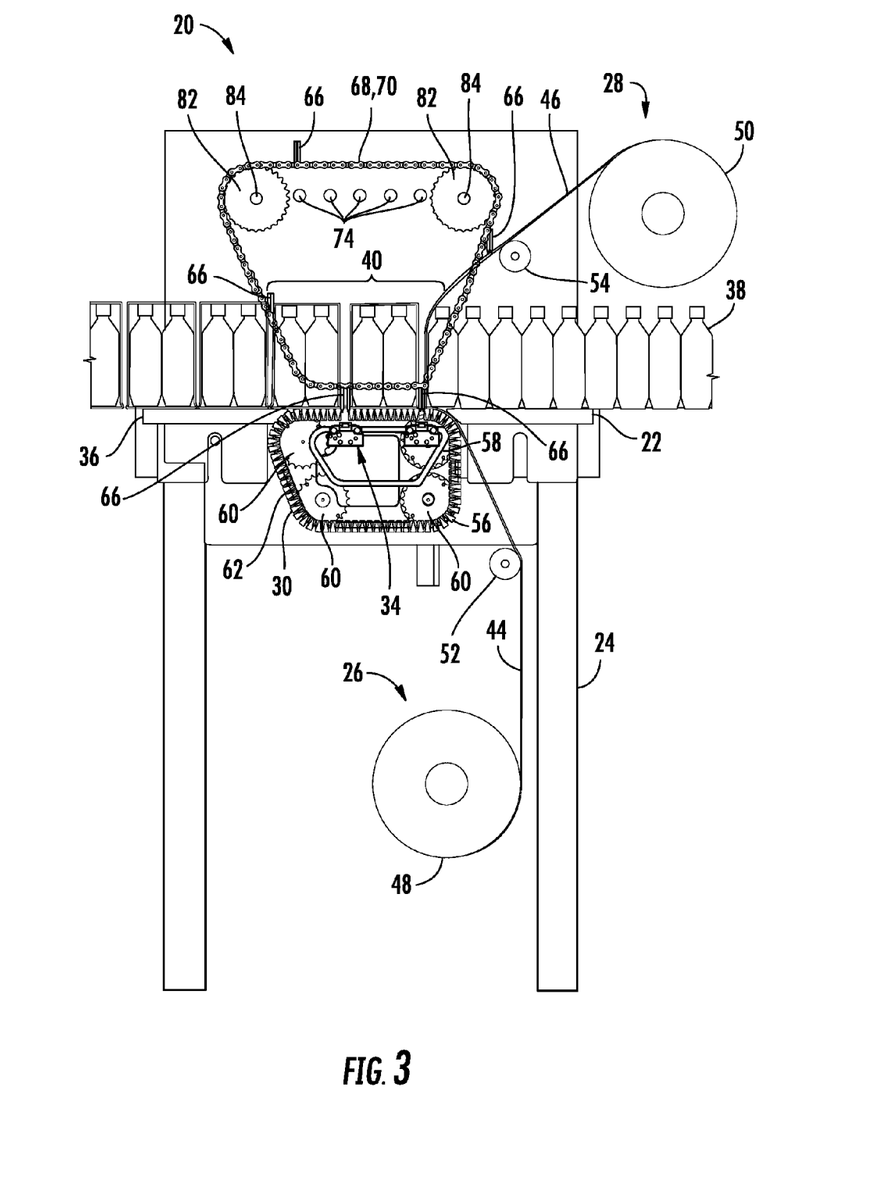
FIG. 3 is a side diagrammatical view of the apparatus of FIG. 1.

More particularly, apparatus 20 shown generally in FIGS. 1-3 includes an article feed 22, a frame 24, a first film supply 26, a second film supply 28, a wrapping conveyor 30, a flight bar subassembly 32, a heating subassembly 34, and an article exit 36. Articles 38 are fed via the article feed 22 to a wrapping zone 40 within the frame.

Article feed 22 may comprise any suitable belt, slat, link or roller conveyor, or combinations thereof. If desired, article feed may provide articles 38 at line pressure to wrapping zone 40, so that articles need not be pre-spaced upstream of the wrapping zone into groups to be wrapped together. Article feed 22 may include adjustable side walls 42 or lanes (not shown), movable depending on the number, size and orientation of the articles to be wrapped. Thus, three columns of articles 38 are shown, but other numbers and orientations of columns could be used.

First and second film supplies 26 and 28 are conventional and supply films 44 and 46 from reels 48 and 50 to wrapping zone 40. If desired, film could be supplied in registration using conventional timing marks, sensors, drive controls, etc., so as to feed films 44 and 46 in synchronicity for forming a pleasing or unified package appearance. Guide rollers are schematically indicated at 52 and 54, and gantry systems or the like and motor drives may also be included. Film supplies 26 and 28 may be attached to frame 24 and/or the surroundings as desired.

Wrapping conveyor 30 includes a plurality of individual slats 56 driven by a driven gear 58 and idler gears 60 around a track 62. The slats are individually movable relative to each other along the direction of travel, and may have compression spring members 64 between them (See FIG. 7). Wrapping conveyor 30 may be driven at a speed equal to or different than the speed of article feed 22. First film 44 is fed upward between article feed 22 and wrapping conveyor 30 into wrapping zone 40 so that articles 38 are on top of the first film.

Flight bar subassembly includes a plurality of flight bars 66 driven on chains 68 and 70 (flight bars 66 are not depicted in FIG. 1 for clarity). Each flight bar 66 is driven individually at a variable speed by a respective servo motor 72. Drive rods 74 are provided to transfer rotation from servo motors 72 simultaneously to chains 68 and 70 on both sides of wrapping zone 40. Intermediate chains 76 are provided to transfer rotation from drive rods 74 to chains 68 and 70 via appropriate gearing 78 and 80. Chains 68 and 70 are driven by gears 82 fixed for rotation with gears 80 so as to rotate freely around shafts 84. Gears 86 complete the guide path for chains 68 and 70. Therefore, a given servo motor 72 drives a gear 78 on each side of the wrapping zone to thereby drive an intermediate chain 76. The intermediate chain 76 drives gear 80 which rotates with gear 82, to thereby drive the chain 68 or 70.

A flight bar 66 is attached to an individual one of each of chains 68 and 70. These chains 68 and 70 are driven together via a given servo motor, intermediate chain, and gearing as discussed above. Therefore, the five chains 68 are paired with the five chains 70, as shown, to drive five flight bars 66. Using variable speed servo motors, the speed of the flight bars 66 can be controlled as desired throughout the wrap path. The speed of the flight bars 66 along their cycle can be varied depending on the application, package shape, article shape, number of articles, etc. in an infinite way using the servo motors.

As shown in FIG. 3, second film 46 is fed downward toward articles 38 in the wrapping zone 40. Flight bars 66 pull film 46 downward between articles 38 at an entry side of wrapping zone 40 to create a plurality of loops. At the point each flight bar 66 reaches the bottom of its travel, films 44 and 46 are in contact with each other beneath the flight bar and just above wrapping conveyor 30. The servo motor controls also allow the flight bars 66 to be driven faster across the top of the chains than while near the articles 38 to reduce the number of flight bars and the related drive equipment needed for a particular desired throughput. Also, the servo motors allow the flight bars 66 to be driven slightly faster when initially moving down in between articles and separating them so as to not cause jamming issues with line pressure feed upstream.

Figure 4:
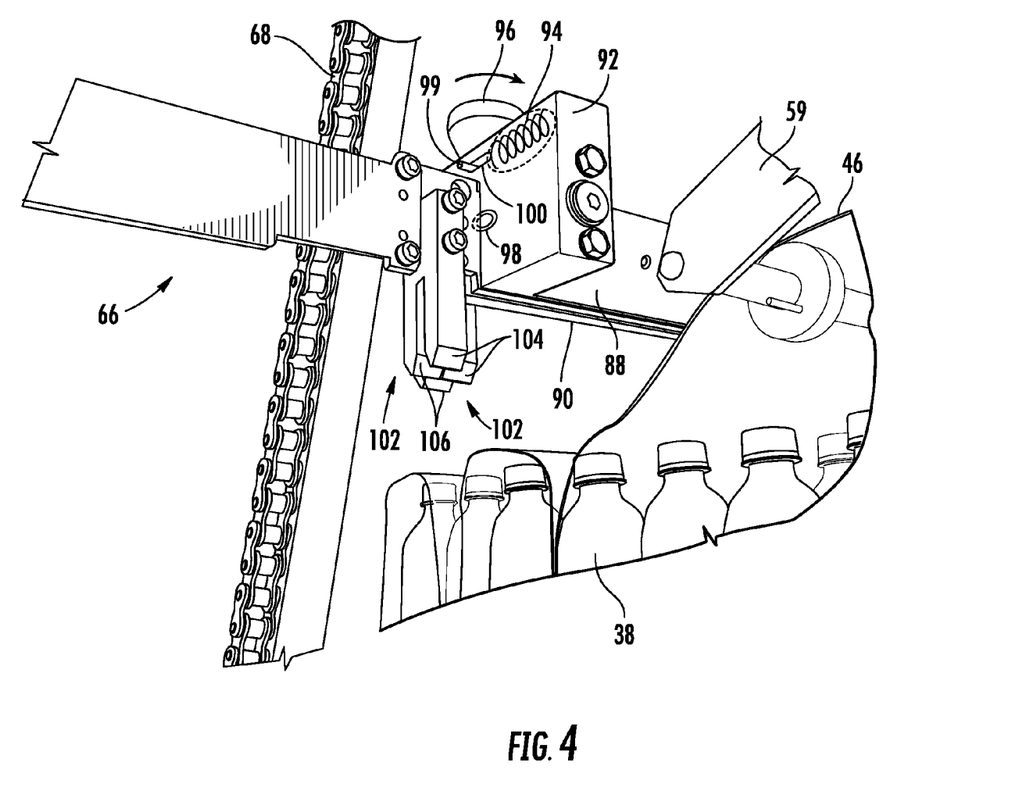
FIG. 4 is 4 is a perspective view of a portion of a flight bar assembly of the apparatus of FIG. 1.
Figure 5:
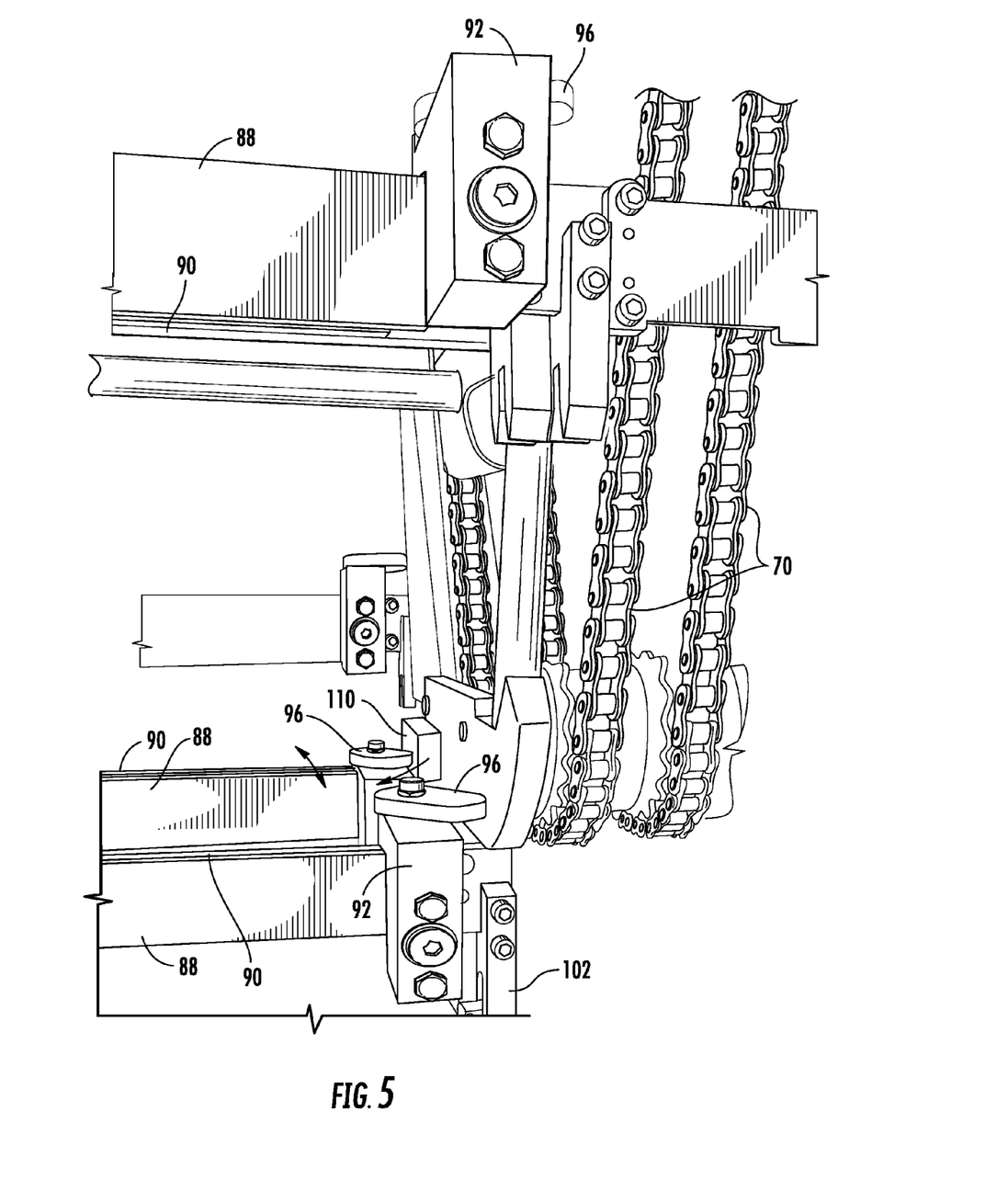
FIG. 5 is another perspective view of a portion of a flight bar assembly of the apparatus of FIG. 1.
Figure 6:
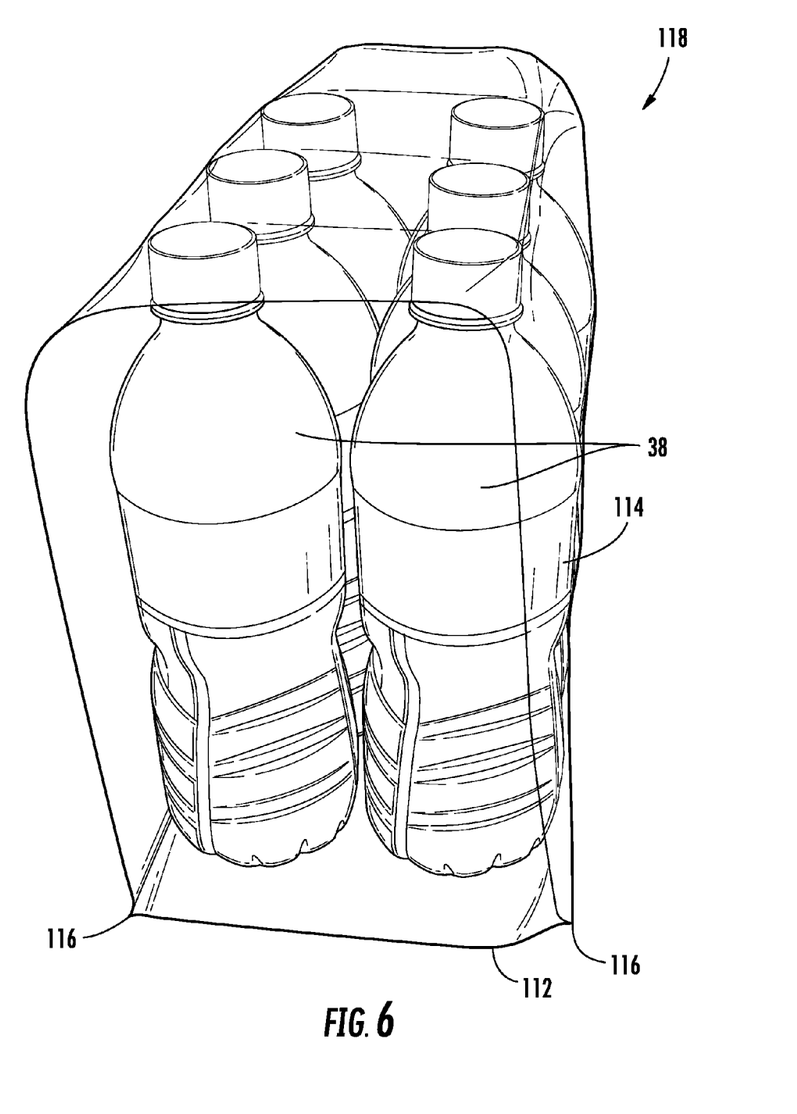
FIG. 6 is a perspective view of one example of a package (before shrinking) that can be made with the apparatus of FIG. 1.

FIGS. 4 and 5 show details of flight bars 66 and chains 68 and 70. As shown, flight bars 66 include two slats 88 and 90 mounted within blocks 92. Slat 88 can be fixedly mounted to block 92, while slat 90 is slidable slightly relative to the block (although this could be reversed). Springs 94 within blocks urge slats 90 toward slat 88 unless moved apart. A cam follower mechanism 96 can be rotated, thereby moving an eccentric 98 within block 92, so as to overcome spring 94 and move slats 88 and 90 apart a distance which can be delimited by movement of pin 98 within slot 100 of block 92. The spring 94 could be a tension spring or compression spring as desired, with reversal of the choice of the slat 88 or 90 attached to block 92 and operation of eccentric 98.

Flight bars 66 include alignment elements 102 each having two prongs 104 and 106. When in the position of FIG. 4, adjacent prongs 104 and 106 are aligned on the two alignment elements. Conventional attachment elements 108 attach flight bars 66 to chains 68 and 70 for movement along the wrapping path in wrapping zone 40. When cam follower 96 rotates due to hitting a camming surface 110 (see FIG. 5) within wrapping zone 40, the adjacent prongs 104 and 106 are forced apart (compare FIGS. 4 and 8, and FIGS. 9 and 10). This moves apart adjacent slats 56 within wrapping conveyor 30. As discussed below, this allows for heat to be provided from below to create an initial bonding of films 44 and 46 together and separation of the films along the bond between groups. Accordingly, the result is a plurality of grouped articles 38 supported by a portion 112 of film 44 covered by a loop 114 of film 46, and joined by two seals 116. Such a preshrink package 118 can then be passed through a heating tunnel or the like to shrink the film about the articles to create a package. The package uses substantially less film than a conventional package where a single piece of film overlaps itself, providing a cost savings. Further, the amount of film used on lateral sides of the package is also reduced as compared to conventional circumferential overlap wrapping. Accordingly, substantial cost saving due to reduced film use is achieved during use of the present apparatus. Further, upstream grouping equipment is not needed due to servo control grouping by use of the flight bars themselves, thereby avoiding the need for the up-front cost of this equipment. The present apparatus thus beneficially provides substantial cost savings upon installation and during use as compared to conventional equipment.

Figure 7:
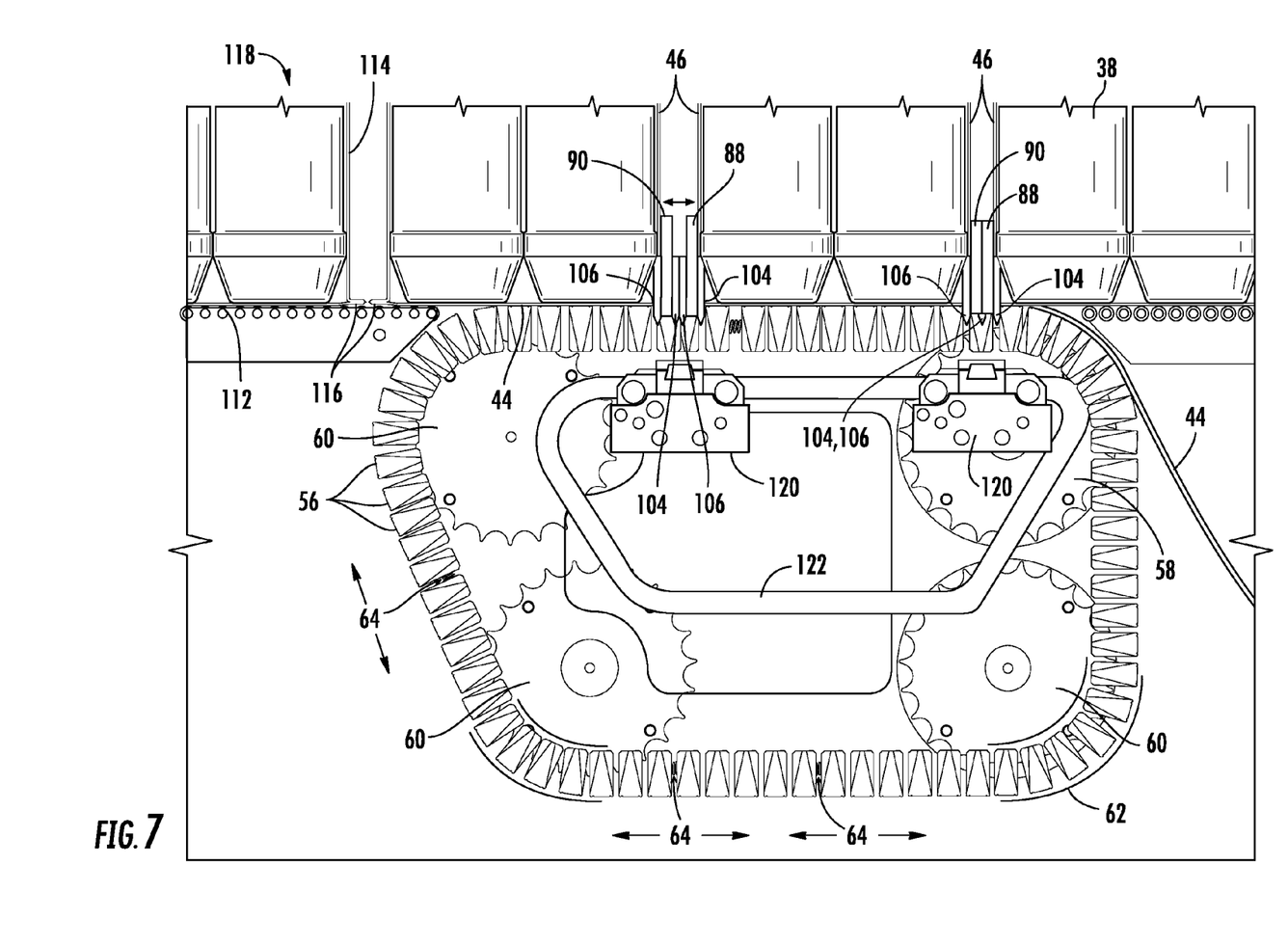
FIG. 7 is a close up view of a portion of the apparatus as in FIG. 3.
Figure 8:
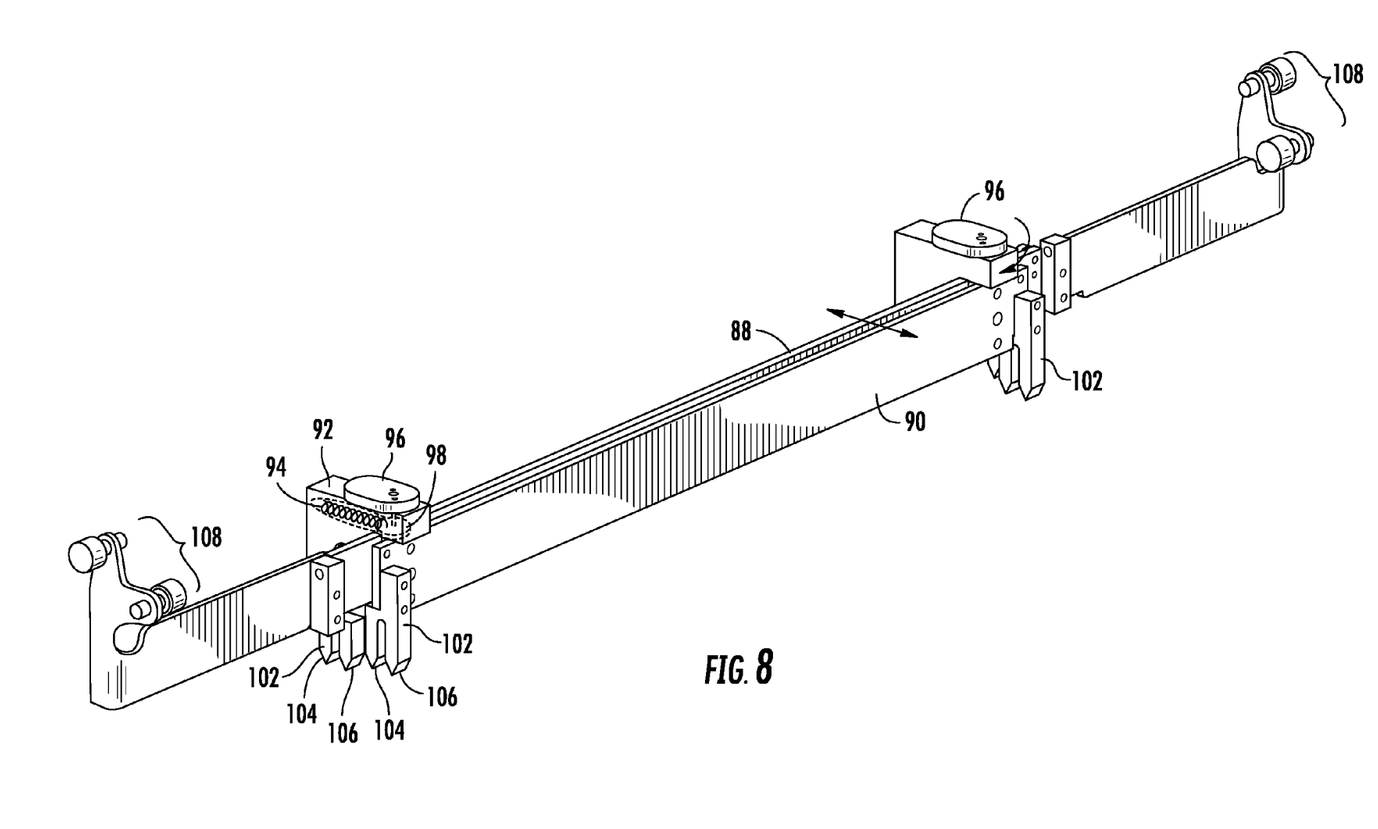
FIG. 8 is a perspective view of one possible flight bar assembly of the apparatus of FIG. 1.
Figure 9:
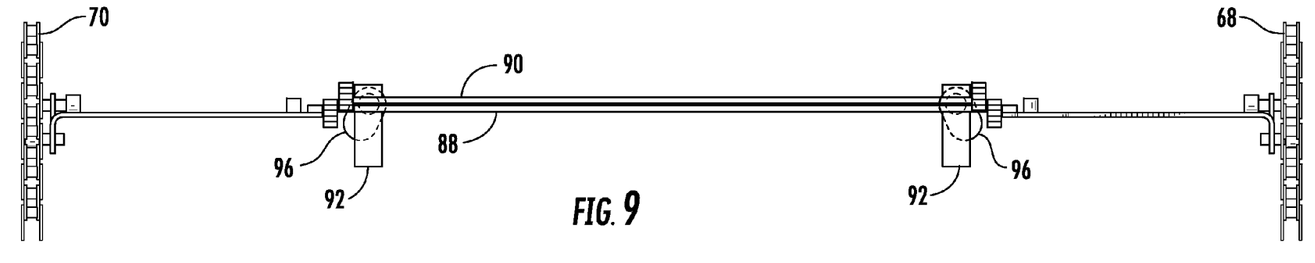
FIGS. 9 and 10 are bottom views of the flight bar assembly of FIG. 8, showing movement from a closed to an opened position.
Figure 10:
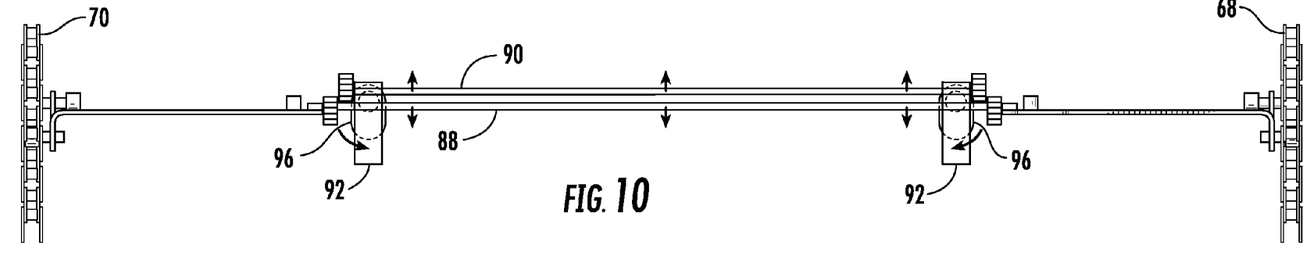
Figure 11:
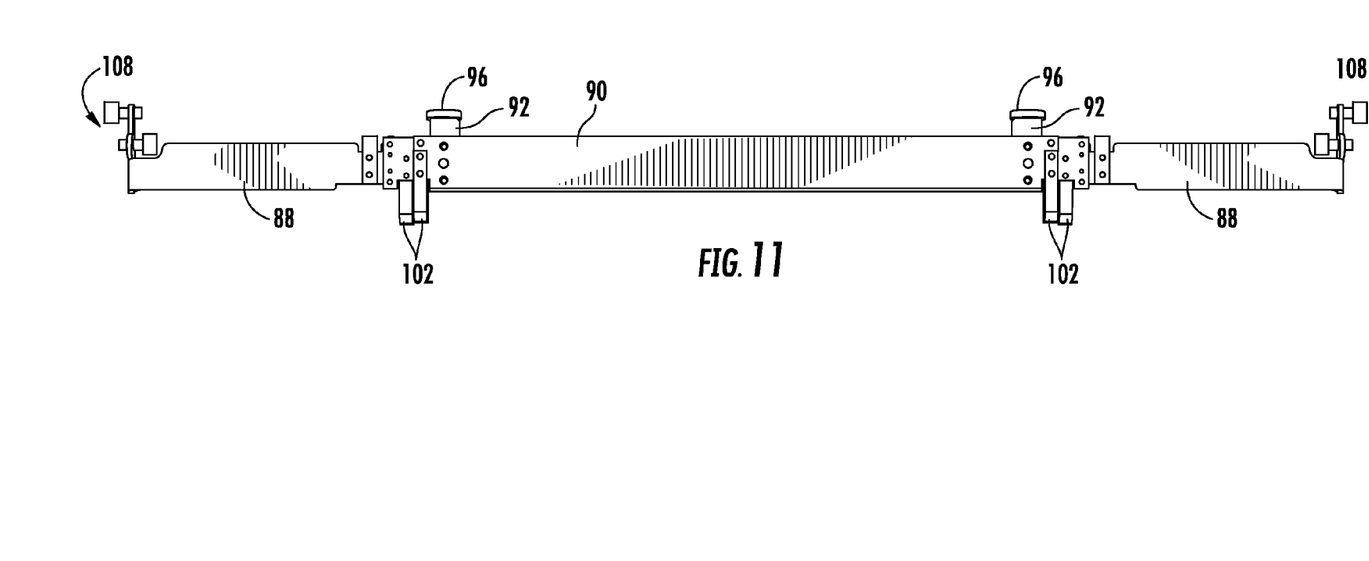
FIG. 11 is an end view of the flight bar assembly of FIG. 8.

A sealing mechanism includes heating subassembly 34. As shown in FIGS. 3 and 7, at least one heating element 120 is provided to run along a track 122 beneath wrapping conveyor 30. Heating element 120 is driven in synchronicity with wrapping conveyor 30 so that heat is provided between the moved-apart slats 88 and 90 after cam follower 96 encounters camming surface 110. If desired, multiple heating elements 120 may be provided, and the heating element(s) may be driven by a servo motor. Also, if multiple heating elements 120 are used, multiple servo motors may be employed in an arrangement equivalent to that disclosed above to drive flight bars 66. Track 122 could include a chain (not shown) or multiple side-by-side chains for moving heating elements 120 individually. Therefore, heating elements 120 can be driven to follow desired film sealing and separation locations in various ways, depending on how other elements are driven within the apparatus.

Figure 12:
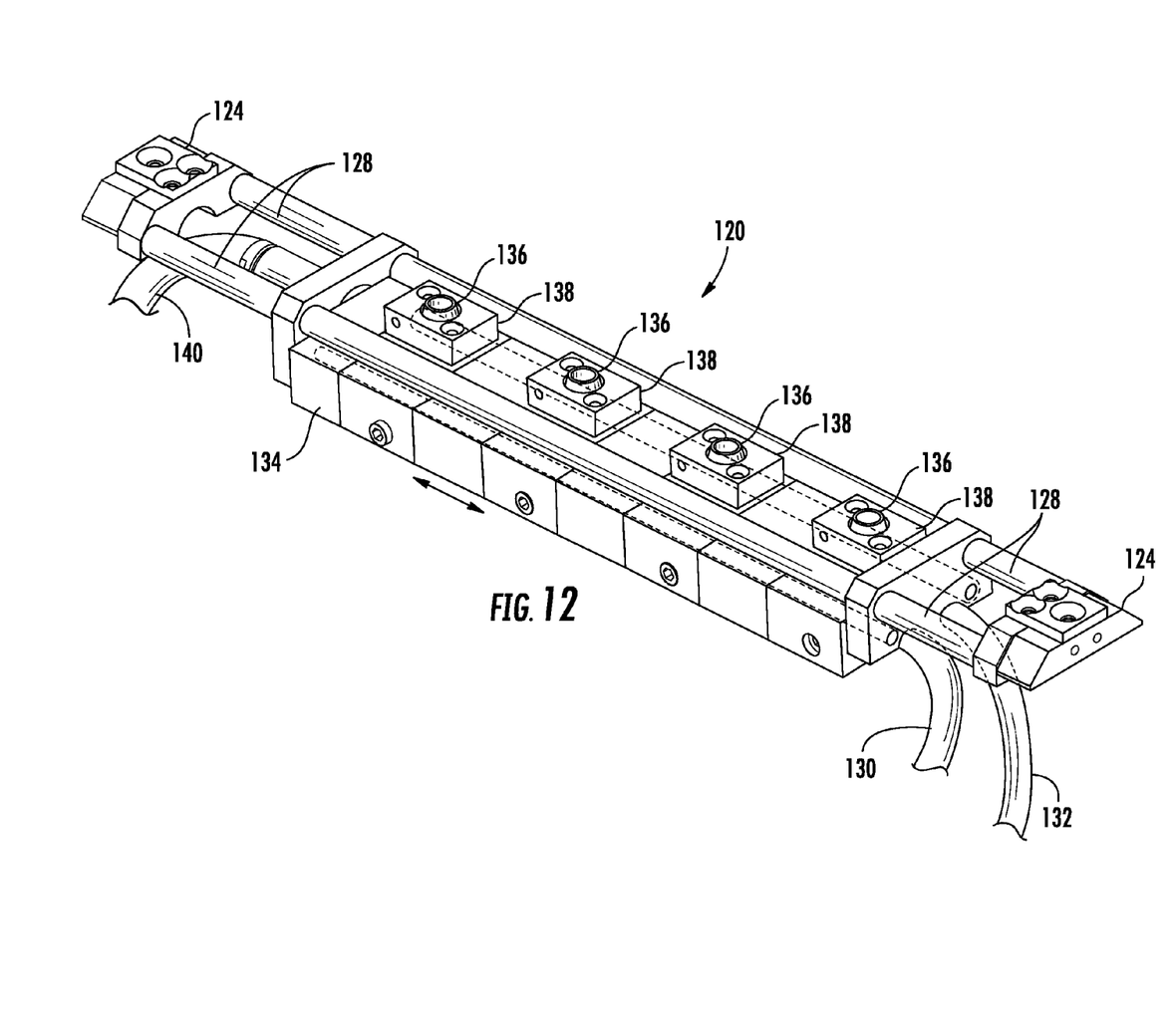
FIG. 12 is a perspective view of one possible heating assembly of the apparatus of FIG. 1.

In the example shown in FIG. 12, heating element 120 includes attachment elements 124 for attaching two bars 128 to drive chains (not shown) that travel along track 122. Sources of flammable gas 130 and oxygen 132 are provided to a housing 134. Four jets 136 are provided on housing 136, each having an adjacent igniter 138. The four jets 136 are provided so as to efficiently cover the desired seal zone, but other arrangements are possible. For example, a thin strip of gas outlets could be used, or another number of jets could be used. If desired, a pneumatic or hydraulic source 140 may be provided to slide housing 134 along bars to provide further coverage. Doing so allows an even more efficient use of gas to cover the entire desired lateral sealing area. The sources 130, 132, and 140 can be connected via conventional gland valves, or other structures to provide the desired fluids to the heating element 120 that moves in a circular path. The size and shape of the heating element can be varied depending on the dimensions package 118 to be created.

Further, other types of elements could be substituted within sealing mechanism instead of a heating element 120. A hot wire, electric, ultrasonic, adhesive, or other film sealing mechanisms could be used. Also, separating devices such as blades, rollers, etc., could be used to separate films if the alternative sealing devices do not fully separate films into preshrink-packages. Further, pre-perforated film or films could be used if fed in registration to assist in separation, and films could have alternating properties along their lengths to allow for sealing and separating at certain points, with use of suitable registration control equipment.

As shown in FIG. 2, a main controller 142, which may be any suitable programmable logic controller, is provided. The main controller is connected to multiple servo motor controllers 144 which are then connected to servo motors 72. Main controller 142 is also illustrated as electrically connected to drives for wrapping conveyor 30 and heating subassembly 34. Additional drive controllers (not illustrated) may be provided and interconnected as appreciated by one skilled in the part. Also, connections may be provided to film supplies, film registration control sensors, etc. Thus, all elements mentioned above could similarly be driven and controlled by the main controller, using servo motors as desired and/or registration type feed back to synchronize movement, in particular within wrapping zone 40 where films 44 and 46 are brought together, sealed, and separated.

The present disclosure is also directed to the inventive aspects of the subassemblies disclosed herein. For example, the interaction of the flight bars drive assemblies, the wrapping conveyor slat structure, their interaction, the interaction of heating and the wrapping conveyor, etc., are also deemed inventive, as well as the overall apparatus. Many of the elements discussed above have independent utility and inventive status apart from the combination to form the apparatus above. Also, methods of using the above independent subassemblies and the entire apparatus are also deemed inventive aspects of the present disclosure. Therefore, it should be appreciated that the full scope of the inventive subject matter includes all such subject matter and disclosures.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A shrink film applying apparatus comprising:
    an article feed for feeding articles for shrink-wrapping at line pressure;
    a wrapping conveyor driven at a wrapping speed through a wrapping zone, the wrapping conveyor receiving articles from the article feed;
    a first film supply supplying a first film to the wrapping zone, the first film being fed to a position above the wrapping conveyor and beneath the articles;
    a second film supply supplying a second film to the wrapping zone, the second film being fed to a position above the first film and the articles;
    a plurality of flight bars and a plurality of flight bar drives, each flight bar individually driven in a path at a variable speed by a respective one of the flight bar drives, the second film being sequentially pulled down between selected articles by the flight bars so as to form loops of the second film in the wrapping zone between adjacent flight bars, each loop of the second film having a contact point adjacent the respective flight bar contacting the first film; and a sealing mechanism within the wrapping zone for sealing the first film to the second film at the contact points to form a circumferential film unit substantially surrounding grouped articles within each loop of second film and a corresponding portion of the first film, the film unit being shrinkable about the grouped articles to form a package.

2. The apparatus of claim 1, wherein the wrapping conveyor includes a plurality of independent slats and a track, the slats being driven by a drive along the track in a path, each of the slats being movable relative to adjacent slats along the path.

3. The apparatus of claim 2, wherein the flight bars each include alignment elements configured to fit between adjacent slats in the wrapping conveyor, the alignment elements self-adjustably moving certain of the slats relative to each other to an extent necessary for the alignment elements to fit between the slats as the flight bars approach the wrapping conveyor.

4. The apparatus of claim 3, wherein the flight bars include two plates mounted so as to be movable relative to each other in a direction of travel, the flight bars contacting a frame of the shrink film applying assembly in the wrapping zone to move apart the two plates, the alignment elements moving apart adjacent slats of the wrapping conveyor when the plates of the flight bars move apart.

5. The apparatus of claim 4, wherein the sealing mechanism is disposed beneath the wrapping conveyor, the sealing mechanism proving heat to the wrapping zone to seal the first film to the second film.

6. The apparatus of claim 5, wherein the sealing mechanism provides heat at least when the two plates of the flight bars and the adjacent slats are moved apart.

7. The apparatus of claim 6, further including a controller, the controller controlling the flight bar drives, a wrapping conveyor drive, and a sealing mechanism drive so that the flight bars, the wrapping conveyor and the sealing mechanism operate in synchronicity.

8. The apparatus of claim 7, wherein the controller causes the wrapping conveyor to be driven at a constant speed and the flight bars and sealing mechanism to be driven at a constant speed within at least a portion of the wrapping zone.

9. The apparatus of claim 8, wherein the controller causes the flight bars and sealing mechanism to be driven at a variable speed along at least a portion of their respective travel.

10. The apparatus of claim 1, wherein the sealing mechanism and flight bars cooperate to separate adjacent respective film units and grouped articles within the wrapping zone.

11. The apparatus of claim 10, wherein the flight bars include two plates mounted so as to be movable relative to each other in a direction of travel, the flight bars contacting a frame of the shrink film applying apparatus in the wrapping zone to move apart the two plates, thereby separating the adjacent film units and grouped articles.

12. The apparatus of claim 1, wherein the wrapping conveyor includes compression spring elements between adjacent slats.

13. The apparatus of claim 1, wherein each of the fight bar drives includes a variable speed servo-motor for driving a chain, a respective one of the flight bars being attached to each chain.

14. The apparatus of claim 13, wherein the apparatus includes at least four of the flight bars and flight bar drives.

* * * * *